(12) United States Patent
Scherer et al.

(10) Patent No.: US 8,708,862 B2
(45) Date of Patent: Apr. 29, 2014

(54) PLANETARY GEAR TYPE MULTI-STAGE TRANSMISSION

(71) Applicant: ZF Friedrichshafen AG, Friedrichshafen (DE)

(72) Inventors: Heribert Scherer, Meckenbeuren (DE); Gert Bauknecht, Friedrichshafen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/864,304

(22) Filed: Apr. 17, 2013

(65) Prior Publication Data
US 2013/0288847 A1    Oct. 31, 2013

(30) Foreign Application Priority Data
Apr. 27, 2012  (DE) .......................... 10 2012 207 018

(51) Int. Cl.
*F16H 3/44*    (2006.01)
(52) U.S. Cl.
USPC ........................... 475/288; 475/282; 475/903
(58) Field of Classification Search
USPC ........................ 475/275, 277, 282, 288, 903
See application file for complete search history.

(56) References Cited

U.S. PATENT DOCUMENTS

| | | | |
|---|---|---|---|
| 8,210,981 B2 * | 7/2012 | Bauknecht et al. | 475/275 |
| 8,343,007 B2 * | 1/2013 | Hart et al. | 475/288 |
| 8,353,801 B2 * | 1/2013 | Hart et al. | 475/276 |
| 8,398,522 B2 | 3/2013 | Bauknecht et al. | |
| 2006/0046886 A1 * | 3/2006 | Holmes et al. | 475/5 |
| 2010/0041509 A1 * | 2/2010 | Gumpoltsberger et al. | 475/275 |
| 2012/0010038 A1 * | 1/2012 | Hart et al. | 475/296 |
| 2012/0065019 A1 * | 3/2012 | Hart et al. | 475/271 |

FOREIGN PATENT DOCUMENTS

DE    10 2008 000 429 A1    9/2009

OTHER PUBLICATIONS

German Search Report Corresponding to 10 2012 207 018.4.

* cited by examiner

*Primary Examiner* — Justin Holmes
(74) *Attorney, Agent, or Firm* — Davis & Bujold, PLLC; Michael J. Bujold

(57) ABSTRACT

A motor vehicle multi-stage planetary transmission which has a housing that accommodates four planetary gear sets (P1, P2, P3, P4), shafts (2-9), three clutches (K1, K2, K3) and three brakes (B1, B2, B3) whose selective actuation implements various transmission ratios between drive and output shafts. The carriers of gear sets (P1, P2) are connected by shaft (4), the ring gear of gear set (P2) can be fixed to the housing, via shaft (5), by actuating brake (B1). A ring gear of gear set (P1) and a sun gear of gear set (P2) are coupled by shaft (6) which can be connected, via clutch (K1), to the drive shaft. A sun gear of gear set (P1) can be fixed, via brake (B2), to the housing and can be coupled, by clutch (K2), to drive shaft. The first and second clutches (K1, K2) are startup elements which initiate startup procedures.

9 Claims, 2 Drawing Sheets

| GEAR | K1 | K2 | K3 | B1 | B2 | B3 | i | φ |
|------|----|----|----|----|----|----|------|------|
| R | | X | | X | | X | -3.15 | — |
| 1 | X | | | X | | X | 4.61 | 1.61 |
| 2 | X | | | | X | X | 2.87 | 1.56 |
| 3 | X | X | | | | X | 1.84 | 1.36 |
| 4a | (X) | | X | | | X | | |
| 4b | | (X) | X | | | X | 1.36 | 1.36 |
| 4c | | | X | | (X) | X | | |
| 4d | | | X | (X) | | X | | |
| 5 | X | X | X | | | | 1.00 | 1.26 |
| 6 | X | | X | | X | | 0.79 | 1.14 |
| 7 | X | | X | X | | | 0.69 | 1.20 |
| 8 | | | X | X | X | | 0.58 | 1.25 |
| 9 | | X | X | X | | | 1.46 | Total: 10.0 |

PLANETARY GEAR TYPE MULTI-STAGE TRANSMISSION

This application claims priority from German patent application serial no. 10 2012 207 018.4 filed Apr. 27, 2012.

FIELD OF THE INVENTION

The invention relates to a multi-stage transmission in planetary design, particularly an automatic transmission of a motor vehicle, having a housing, which accommodates four planetary gear sets and several shafts, and having clutches and brakes, by means of the targeted actuation of which various transmission ratios can be represented between a drive shaft and an output shaft running coaxially to the drive shaft, wherein a carrier of a first planetary gear set is connected by means of a third shaft to a carrier of a second planetary gear set, the ring gear of which can be fixed to the housing by means of a fourth shaft by actuating of a first brake, wherein further a ring gear of the first planetary gear set and a sun gear of the second planetary gear set are coupled by a fifth shaft, which can be connected via a first clutch to the drive shaft, and wherein a sun gear of the first planetary gear set can be fixed by means of a sixth shaft via a second brake to the housing and can be coupled by means of a second clutch to the drive shaft.

BACKGROUND OF THE INVENTION

Multi-stage transmissions of this type are used particularly with motor vehicles and are typically connected to an internal combustion engine of the motor vehicle via an intermediately located startup element, frequently a hydrodynamic torque converter. However, particularly with transverse mounted transmissions, there is only limited axial construction space available for representing the required number of gears in each case, such that it is necessary to have as compact a design as possible.

The document DE 10 2008 000 429 A1 shows a multi-stage transmission in planetary design in which a total of four planetary gear sets and several shafts are accommodated in a housing. Two of the four planetary gear sets form an input side gear set, while the remaining planetary gear sets define a main gear set. The planetary gear sets can now be coupled among each other by means of the shafts such that by targeted actuation of clutches and brakes, different transmission ratios can be represented between a drive shaft of the transmission and an output shaft running coaxially to the drive shaft. Here, a carrier of a first planetary gear set of the input side gear set is connected via a third shaft to a carrier of a second planetary gear set of the input side gear set, wherein a ring gear of the second planetary gear set can additionally be fixed to the housing by means of a fourth shaft by targeted actuation of a first brake. Additionally, a ring gear of the first planetary gear set and a sun gear of the second planetary gear set are coupled together via a fifth shaft, which can be connected via a first clutch to the drive shaft. A sun gear of the first planetary gear set can additionally be fixed to the housing by means of a sixth shaft via a second brake, and can be coupled to the drive shaft by means of a second clutch. Here, the multi-stage transmission has a drive-side startup element, particularly a hydrodynamic torque converter or an external startup clutch as a startup element. Apart from that, it is also proposed to use the first brake, for example, as an integrated startup element.

SUMMARY OF THE INVENTION

Based on the prior art described above, the problem addressed by the present invention is to provide a planetary gear multi-stage transmission which is distinguished by a compact construction, particularly in the axial direction.

According to the invention, a multi-stage transmission in planetary design has a housing in which four planetary gear sets and several shafts are accommodated. Additionally, this multi-stage transmission has clutches and brakes, by the targeted actuation of which different transmission ratios can be implemented between a drive shaft and an output shaft running coaxially to the drive shaft. In the context of the invention, the first planetary gear set and the second planetary gear set form an input side gear set, while a main gear set is formed by the remaining two planetary gear sets. In addition, the planetary gear sets are each preferably formed as a minus planetary gear set, however it is also conceivable in the scope of the invention to convert one or more of the minus planetary gear sets into plus planetary gear sets, at places where this is allowed by the connectability. In the latter named case, simultaneously, a carrier and a ring gear connection are then exchanged with each other and the value of the standard transmission ratio is increased by one.

As is well known, a simple minus planetary gear set comprises a sun gear, a ring gear, and a carrier which rotatably supports the planetary gears, which each mesh with the sun gear and the ring gear. In the case of a fixed carrier, a direction of rotation of the ring gear is counter to that of the sun gear. In contrast to this, a simple plus planetary gear set comprises a sun gear, a ring gear and a carrier, which rotatably supports inner and outer planetary gears. Here, all inner planetary gears mesh with the sun gear, and all outer planetary gears mesh with the ring gear, wherein in addition each of the inner planetary gears is engaged with an outer planetary gear. In the case of a fixed carrier, the ring gear has the same direction of rotation as the sun gear.

Additionally, the clutches and brakes can individually generally be implemented as force-locking shift elements, such as multi-disk clutches or multi-disk brakes, or as form-locking shift elements, such as claw clutches or claw brakes for example. The latter is only possible, however, if the shift element concerned is to be transferred only from an engaged state into a disengaged state with an upshift along the gear sequence.

The invention comprises the technical teaching that the first and the second clutch are implemented as force-locking startup elements, using which each can represent a startup procedure. These force-locking startup elements are preferably implemented here in the form of multi-disk clutches, which using, slippage during startup, respectively equalize rotational movement of the fifth or sixth shaft to a rotational movement of the drive shaft running at the engine speed. These multi-disk clutches are then designed as wet clutches which are cooled using cooling oil for dissipating the heat generated during slipping operation.

Using the design of a multi-stage transmission according to the invention it is possible to eliminate a respective startup element upstream of the drive shaft, for example a hydrodynamic torque converter, by using two clutches as integrated startup elements. As a result the construction length in the axial direction of the multi-stage transmission can be respectively shortened. Additionally, the weight and the production expense of the multi-stage transmission can be reduced by eliminating an input-side converter. By dividing the startup procedures between two integrated startup elements, one of which is assigned to startup in the forward direction and one of which is assigned to startup in the reverse direction, the loading of the startup elements can be reduced due to the reduced number of startups to be represented by the individual startup element. Finally, due to the division between the two startup clutches, and depending on specific shifting of the first forward gear and the reverse gear using the shift elements, a changeover between the two directions of travel can be substantially accelerated in that only the two startup clutches are to be shifted for reversing direction. Then, if the same shift elements are actuated in the first forward gear and the reverse gear, with the exception of the two startup clutches, both travel directions can be changed quickly due to said shifting between the startup clutches.

In contrast to this arrangement, in the document DE 10 2008 000 429 A1 either a startup element is provided upstream of the drive shaft, which correspondingly increases the axial construction length of the multi-stage transmission, or it can revert back to the first brake as an internal startup clutch, which can fix the ring gear of the second planetary gear set to the housing by means of the intermediately located fourth shaft. In doing so, for reversing between the forwards and the reverse direction however, along with disengaging and engaging the first brake, the shift state of two additional shift elements is to be changed such that the implementation of the reversing procedure is complex. Additionally, startup procedures in both directions of travel are to be represented using the one integrated startup element, which correspondingly increases the load to this startup element.

Accordingly, in an advantageous embodiment of the multi-stage transmission, the third shaft is also connected to a ring gear of the third planetary gear set, the carrier of which is coupled, via a seventh shaft, to a ring gear of a fourth planetary gear set. Additionally, the seventh shaft can be coupled by means of a third clutch to the drive shaft, while a sun gear of the third planetary gear set and a sun gear of the fourth planetary gear set are connected together via an eighth shaft which can be fixed to the housing by means of a third brake. Finally, in addition, a carrier of the fourth planetary gear set is connected to the output shaft.

With this design then, a first forwards gear is preferably obtained by engaging the first brake and the third brake, and the first clutch, whereas a reverse gear can be engaged by actuating the first and third brakes and the second clutch. Here, the startup procedure in the first forward gear is represented using the first clutch and the start of procedure in the reverse gear is represented using the second clutch. Rapid reversing between forward and reverse travel is possible with such shifting of the first forward gear and the reverse gear using the shift elements, because in each case in order to change the direction of travel, the only shifting required is between the first and the second clutch. In a further development of this design, a second forward gear results from engaging the second and the third brakes and the first clutch, whereas a third forward gear can be represented by actuating the first and the second clutch and the third brake. A fourth forward gear can then be shifted by engaging the third brake and the fourth clutch, while a fifth forward gear can be represented by means of actuating the first, second and the third clutch. Furthermore, a sixth forward gear results from engaging the first and third clutch, and the second brake, wherein a subsequent seventh forward gear can be shifted by actuating the first and the third clutch and the first brake. Finally, the eighth forward gear is represented by engaging the first and the second brake and the third clutch, and a ninth forward gear is represented by actuating the second and the third clutch, and the first brake.

A total of nine forward gears and one reverse gear can be realized according to this design of the multi-stage transmission according to the invention and using the specified actuation of the individual shift elements. According to the invention, in the fourth forward gear an additional shift element is to be actuated along with the third brake and the third clutch in order to prevent uncontrolled rotation of the two planetary gear sets of the input side gear set not participating in the implementation of the fourth forward gear. The second clutch is also preferably controlled here, because in this case there are low differential speeds at the disengaged shift elements, which with multi-disk clutches or multi-disk brakes leads to a decrease of drag losses due to the lower shear effect between the inner and outer disks.

According to a further design of the invention, the first and the second clutch are disposed in the housing lying directly adjacent to each other, wherein the multi-disk packets of the two clutches are placed particularly located radially above one another with respect to an axis of rotation of the drive shaft. Using such a layout of the multi-stage transmission, a common cooling oil line can be provided for the two startup clutches, which correspondingly simplifies the design and allows an even more compact construction.

According to the invention, a torsion damper is disposed between the input side of the multi-stage transmission and the drive shaft. This way, torsion oscillations introduced on the input side, which are the result of ignition-dependent rotation irregularities of the internal combustion engine, or are occurring due to load change as a result of rapid accelerator actuations, can be reduced.

According to a further advantageous embodiment of the invention, axial supply channels run in the drive shaft, starting from a drive-side end region, to an opposite end region. Hereby, oil can be supplied, using the drive shaft, to the region located away from the input side, so that radial bore holes that would otherwise have to be provided in this end region for the oil supply can be omitted, which further reduces the axial construction length of the multi-stage transmission according to the invention. Using the supply channels provided in the drive shaft, a shift element placed at an end facing away from the input side can be provided with a supply of pressure oil and cooling oil, and in addition, components located there can be implemented having a supply of lubricating oil. Preferably, the first and the second clutch at the end region of the drive shaft facing away from the input side are particularly intended to be used for this, wherein a total of four supply channels then run in the drive shaft, one channel of which is for the cooling oil supply of both clutches, one channel is for the compressed oil supply of the first clutch, one channel is for the pressure oil supply of the second clutch and one channel is for the lubricating oil supply.

In a further development of the invention, the second brake and the second clutch are implemented as multi-disk shift elements, the inner disks of which, or the outer disks of which, are guided together by the sixth shaft. As a result, the second brake and the second clutch can be implemented using the same disks which reduces the manufacturing expense. The second brake and the second clutch, in particular, are disposed lying axially close together.

The invention is not limited to the stated combination of features of the main claim or the dependent claims. Moreover, the possibility arises of combining together individual features, which arise from the patent claims, the following description of an embodiment, or directly from the drawings. Furthermore, the reference of the patent claims to the drawings through use of reference numbers shall not limit the scope of protection of the patent claims.

BRIEF DESCRIPTION OF THE DRAWINGS

Further advantageous embodiments of the invention arise from the subsequent description of a preferred embodiment of the invention with reference to the figures represented in the drawings. Shown are.

DETAILED DESCRIPTION OF THE PREFERRED EMBODIMENTS

Figures 1, 3:
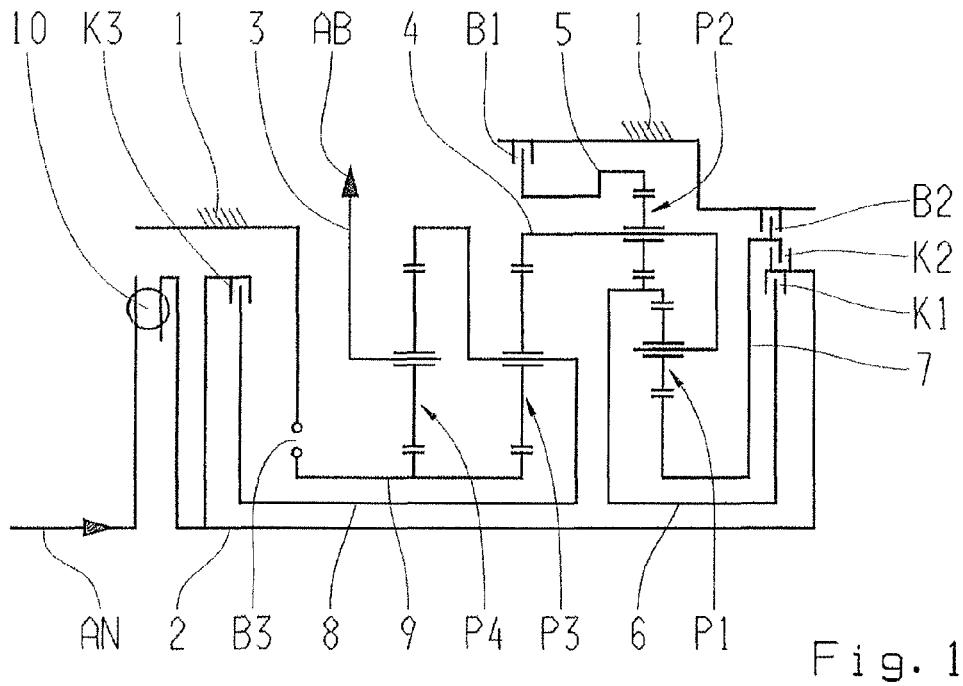
FIG. 1 a schematic representation of a multi-stage transmission according to the invention according to a preferred embodiment of the invention.
FIG. 3 an example shift pattern of the multi-stage transmission from FIG. 1.

FIG. 1 shows a schematic representation of a multi-stage transmission according to a preferred embodiment of the invention. This multi-stage transmission has a housing 1, which accommodates four planetary gear sets P1 to P4, several shafts 2 to 9, and shift elements in the form of clutches K1 to K3 and brakes B1 to B3. According to an actuation of the clutches K1 to K3 and the brakes B1 to B3, different transmission ratios can be implemented between a drive shaft 2 connected to a input side AN of the transmission and an output shaft 3 that runs transverse to the drive shaft 2 and which forms the output side AB of the multi-stage transmission.

The four planetary gear sets P1 to P4 are each presently designed as minus planetary gear sets, wherein the first planetary gear set P1 and the second planetary gear set P2 form a shiftable input side gear set, while the third planetary gear set P3 and the fourth planetary gear set P4 define a main gear set of the multi-stage transmission according to the invention. Here, the third planetary gear set P3 and the fourth planetary gear set P4 are arranged axially behind one another, while the first planetary gear set P1 and the second planetary gear set P2 are positioned nearly axially at the same height and radially lying next to each other.

As further seen in FIG. 1, a first clutch K1, a second clutch K2 and a third clutch K3, and a first brake B1 and a second brake B2 are each implemented as force-locking shift elements in the form of multi-disk clutches or multi-disk brakes, of which the clutches K1 to K3, by the actuation thereof, couple two shafts together in the rotational movement thereof, while in the case of the brakes B1 and B2, the respective shaft is fixed to the housing 1. In contrast to this, a further, third brake B3 is implemented as a form-locking shift element in the form of a claw brake, in which case using the form-locking, the associated shaft is fixed to the housing 1 due to the contact of the two shifting claws. In the case of the third brake B3, a design as a force-locking shift element is also conceivable.

In the present case, along with the drive shaft 2 and the output shaft 3, a third shaft 4, a fourth shaft 5, a fifth shaft 6, a sixth shaft 7, a seventh shaft 8, and an eighth shaft 9 are accommodated in the housing 1. According to the invention, the third shaft 4 couples the carrier of the two planetary gear sets P1 and P2 together, and additionally creates a connection to a ring gear of the third planetary gear set P3. Additionally, a ring gear of the second planetary gear set P2 can be fixed to the housing 1 via the fourth shaft 5 and by actuating the first brake B1, while a sun gear of the second planetary gear set P2 is connected by means of the fifth shaft 6 to a ring gear of the first planetary gear set P1, wherein the fifth shaft 6 can be coupled to the drive shaft 2 by controlling the first clutch K1 in the direction of rotation thereof.

As further seen in FIG. 1, the drive shaft 2 can, by actuation of the second clutch K2, be additionally connected to the sixth shaft 7, which is connected to a sun gear of the first planetary gear set P1 and can be fixed to the housing 1 via the second brake B2. In addition, by controlling the third clutch K3 in the rotational movement thereof, the drive shaft 2 can be coupled to the seventh shaft 8, which connects a carrier of the third planetary gear set P3 to a ring gear of the fourth planetary gear set P4. Finally, the sun gears of the third planetary gear set P3 and the fourth planetary gear set P4 can be connected together via the eighth shaft 9, which can be fixed to the housing 1 by controlling the third brake B3, while a carrier of the fourth planetary gear set P4 is connected to the output shaft 3.

Now, as a special feature, the input side AN of the multi-stage transmission and the drive shaft 2 are coupled together only via a torsion damper 10, which, using a design known to a person skilled in the art, dampens rotational oscillations introduced via the input side AN using mechanical friction. In contrast, the two clutches K1 and K2 are provided as startup elements, which for this purpose are implemented as force-locking shift elements in the form of multi-disk clutches. Here, the first clutch K1 functions as a startup clutch for a startup procedure in a first forward gear, whereas the second clutch K2 forms the startup clutch for a startup procedure in a reverse gear. As is additionally apparent from the detailed view shown in FIG. 1, and in particular, from FIG. 2, a disk packet 22 of the clutch K1 and a disk packet 23, formed by outer disks 17 and inner disks 18, of the clutch K2 are disposed located radially above one another with respect to an axis of rotation of the drive shaft 2, such that it is possible that the disks can be supplied with cooling oil via a common cooling oil line, not presently represented. This supply of cooling oil has an axial supply channel 11, which runs within the drive shaft 2 producing a connection to the input side AN, so that it is possible to supply oil from this side. Apart from the axial supply channel 11, in addition, three further supply channels 12, 13 and 14 are running in the drive shaft 2, of which a supply channel 12 is assigned to a pressure oil supply 15 of the first clutch K1, a supply channel 13 is assigned to a pressure oil supply 16 of the second clutch K2, and a supply channel 14 is assigned to a lubricating oil supply. The supply channels 11 to 14, respectively, run at an angle of approximately 90° to each other in the circumferential direction of the drive shaft 2, wherein the supply channel 12 and the supply channel 14 lie in a plane, while the supply channels 11 and 13 run in a plane rotated by approximately 90° hereto and are presently projected in the drawing plane of FIG. 2 only in a rudimentary fashion.

Figure 2:
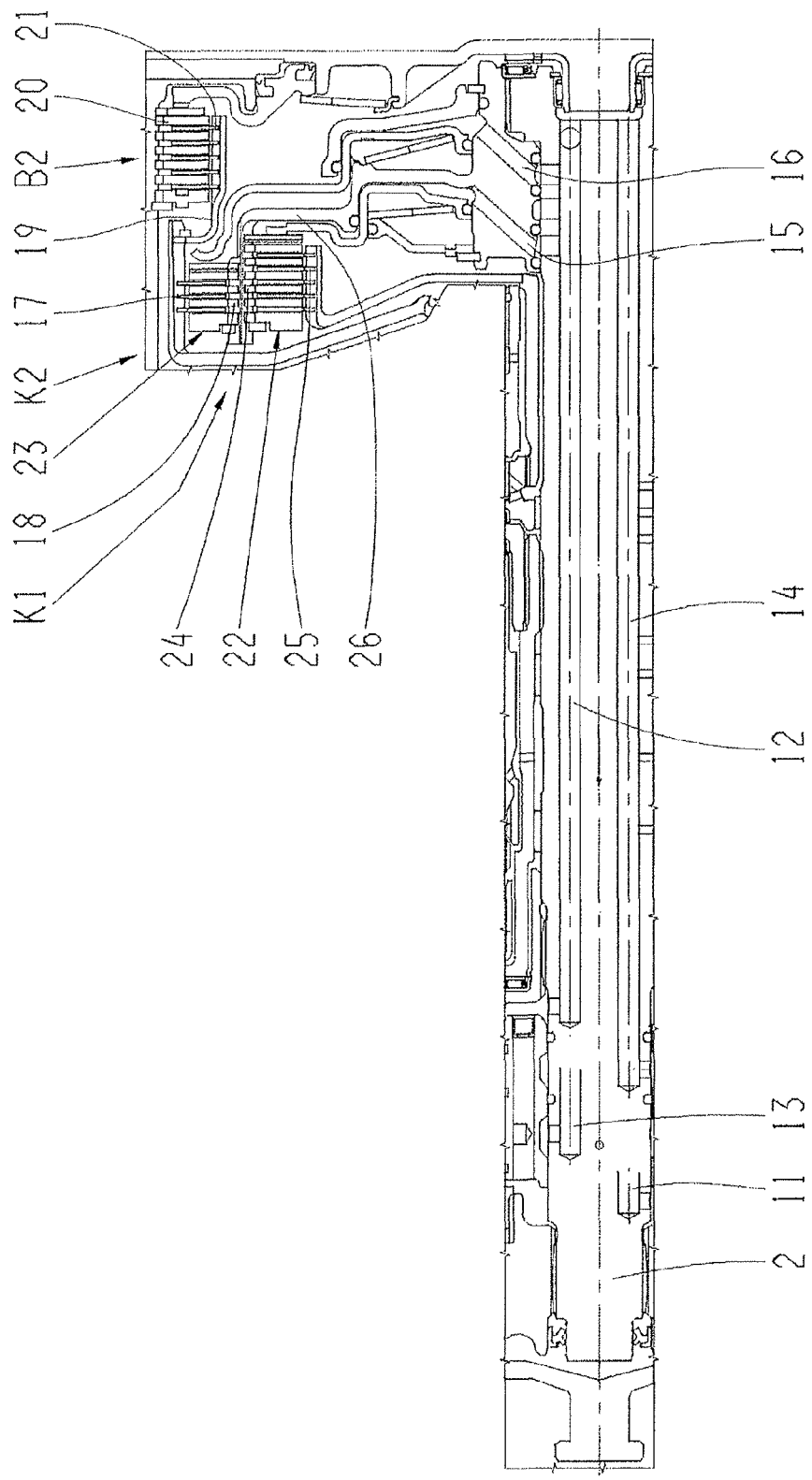
FIG. 2 a detailed view of a region of the multi-stage transmission from FIG. 1.

Additionally it can be seen in the detailed view in FIG. 2 that the second clutch K2 and the second brake B2 are disposed radially nearly at the same height and axially located behind one another, in that with respect to the second clutch K2 the outer disks 17 are guided through the sixth shaft 7 between the inner discs 18 by the drive shaft 2 and axially behind the second clutch K2, a disk carrier 19 is connected to the sixth shaft 7 which supports inner disks 21 running between outer disks 20 connected rotationally fixed to the housing 1. However, it is also conceivable here to provide inner disks or outer disks of both the second clutch K2 and also the second brake B2 on the sixth shaft 7, so that the second clutch K2 and the second brake B2 are implemented as multi-disk clutches and multi-disk brakes of the same design. For this purpose, it is preferable then to modify the embodiment of the second brake B2 such that the housing 1 then guides the inner disks of the second brake B2, while correspondingly the outer disks of the second brake B2 are accommodated by a disk carrier connected to the sixth shaft 7.

FIG. 3 highlights an example shifting pattern of a multi-stage transmission according to the invention according to FIG. 1. As shown, a total of nine forward gears and one reverse gear can be implemented. In addition, the respective transmission ratios i in the individual gears, and the resulting gear increments ϕ to the respectively adjacent gear are specified as an example.

As is evident from FIG. 3, a first gear results from actuating the first brake B1 and the third brake B3 and the first clutch K1, wherein the latter serves as a startup element and during startup procedures equalizes, by slipping, a speed of the fifth shaft 6, starting from a standstill at the beginning, to the rotational movement of the input shaft 2 running at engine speed. For shifting into the adjacent second gear, the first brake B1 is disengaged and the second brake B2 is engaged, while for a further upshift into the third gear then, the second brake B2 is disengaged again and the second clutch K2 is actuated. The fourth gear, following the third gear, is then implemented solely via the third planetary gear set P3 and the fourth planetary gear set P4, and thus via the main gear set, such that actually only the third clutch K3 and the third brake B3 are to be actuated. However, a missing coupling in the input side gear set would lead to uncontrolled rotation of the elements of the first planetary gear set P1 and the second planetary gear set P2. For this reason, a further shift element is actuated in the input side gear set, in addition to the third clutch K3 and the third brake B3, wherein the four possibilities here are represented with 4a-4d in FIG. 3. Preferably however, shifting of the fourth gear occurs according to the variant 4b, because in this case, low speed differences occur at the first clutch K1, the first brake B1 and the second brake B2, which, with the shift elements implemented as multi-disk clutches and multi-disk brakes, results in a lower drag torque and thus, lower losses.

A fifth gear, following the fourth gear, is then implemented by actuating the first clutch K1, the second clutch K2 and the third clutch K3. For the further upshift into sixth gear, then, the second clutch K2 is disengaged and the second brake B2 is actuated, while a subsequent seventh gear results from disengaging the second brake B2 and engaging the first brake B1. Following this, the eighth gear is then shifted to, starting from the seventh gear by disengaging the first clutch K1 and actuating the second brake B2, while the last, ninth, forward gear can be implemented by disengaging the second brake B2 and actuating the second clutch K2.

Additionally, as seen in the example shift pattern from FIG. 3, the reverse gear is shifted to by actuating the first brake B1 and the third brake B3 and the second clutch K2, wherein the second clutch K2 serves here as an integrated startup element. Thus, the second clutch K2, implemented as a multi-disk clutch, equalizes by slipping, the rotational speed of the sixth shaft 7, which is at a standstill at the beginning of the startup procedure, to the rotational movement of the drive shaft 2, wherein the latter runs at the engine speed of the drive machine coupled to the transmission due to the coupling to the input side AN via the intermediately located torsion damper 10.

The axial construction length of the multi-stage transmission can be reduced significantly using the design according to the invention, particularly due to omitting a drive-side upstream startup element, such that this design is particularly suitable for front-transverse applications. Additionally, by omitting a drive-side startup element, the weight and the production costs are also reduced. Furthermore, the shift elements provided as integrated startup elements are subjected to low loads due to the assignment to a travel direction. Finally, due to this assignment and corresponding to shifting of the individual gears, a rapid reversal between forward and reverse travel is possible, in that, for reversing, only the two integrated startup elements must now be shifted.

Finally, it is also conceivable in the scope of the invention to preferably dispose an electric machine as a generator and/or as an additional drive machine on the drive shaft or the output shaft. Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if this embodiment is not explicitly represented in the figures or in the description.

REFERENCE SYMBOLS 1 housing
2 drive shaft
3 output shaft
4 third shaft
5 fourth shaft
6 fifth shaft
7 sixth shaft
8 seventh shaft
9 eighth shaft
10 torsion damper
11 supply channel
12 supply channel
13 supply channel
14 supply channel
15 pressure oil
16 pressure oil
17 outer disks
18 inner disks
19 disk carrier
20 outer disks
21 inner disks
22 disk packet
23 disk packet
AN input side
AB output side
P1 first planetary gear set
P2 second planetary gear set
P3 third planetary gear set
P4 fourth planetary gear set
B1 first brake
B2 second brake
B3 third brake
K1 first clutch
K2 second clutch
K3 third clutch
i transmission ratio
ϕ step change

The invention claimed is:
1. A multi-stage transmission of a planetary design for a motor vehicle, the transmission comprising:
a housing (1) accommodating first, second, third and fourth planetary gear sets (P1, P2, P3, P4) and a plurality of shafts (2 to 9),
first, second and third clutches (K1, K2, K3) and first, second and third brakes (B1, B2, B3) whose selective actuation implements various transmission ratios between a drive shaft (2) and an output shaft (3), extending coaxially with the drive shaft (2),
a carrier of the first planetary gear set (P1) being connected, via a third shaft (4), to a carrier of the second planetary gear set (P2), the third shaft (4) is additionally connected to a ring gear of the third planetary gear set (P3), a ring gear of the second planetary gear set (P2) being connected to a fourth shaft (5) and being connectable to the housing (1) via actuation of the first brake (B1), a fifth shaft (6) coupling a ring gear of the first planetary gear set (P1) with a sun gear of the second planetary gear set (P2), and the fifth shaft (6) being connectable, via the first clutch (K1), to the drive shaft (2), a sun gear of the first planetary gear set (P1) being fixable, via a sixth shaft (7) and the second brake (B2), to the housing (1) and being connectable, via the second clutch (K2), to the drive shaft (2), the first clutch (K1) and the second clutch (K2) being force-locking startup elements which implement a startup procedure of the transmission; and an eighth shaft (9) couples together a sun gear of the third planetary gear set (P3) with a sun gear of the fourth planetary gear set (P4), and the eighth shaft (9) is fixable to the housing (1) by the third brake (B3).

2. The multi-stage transmission according to claim 1, wherein, a carrier of the third planetary gear set (P3) is coupled, via a seventh shaft (8), to a ring gear of the fourth planetary gear set (P4), the seventh shaft (8) is couplable to the drive shaft (2), via the third clutch (K3), and a carrier of the fourth planetary gear set (P4) is connected to the output shaft (3).

3. The multi-stage transmission according to claim 2, wherein a first forward gear is implemented by engagement of the first brake (B1), the third brake (B3), and the first clutch (K1), a reverse gear is implemented by engagement of the first brake (B1), the third brake (B3), and the second clutch (K2), the startup procedure is implemented, in the first forward gear, via the first clutch (K1), and the startup procedure is implemented, in the reverse gear, via the second clutch (K2).

4. The multi-stage transmission according to claim 3, wherein a second forward gear is implemented by engagement of the second brake (B2), the third brake (B3) and the first clutch (K1);

a third forward gear is implemented by engagement of the first clutch (K1), the second clutch (K2) and the third brake (B3);

a fourth forward gear is implemented by engagement of the third brake (B3) and the third clutch (K3);

a fifth forward gear is implemented by engagement of the first clutch (K1), the second clutch (K2) and the third clutch (K3);

a sixth forward gear is implemented by engagement of the first clutch (K1), the third clutch (K3) and the second brake (B2);

a seventh forward gear is implemented by engagement of the first clutch (K1), the third clutch (K3) and the first brake (B1);

an eighth forward gear is implemented by engagement of the first brake (B1), the second brake (B2) and the third clutch (K3); and a ninth forward gear is implemented by engagement of the second clutch (K2), the third clutch (K3) and the first brake (B1).

5. The multi-stage transmission according to claim 1, wherein a torsion damper (10) is disposed between an input side (AN) of the transmission and the drive shaft (2) of the transmission.

6. The multi-stage transmission according to claim 1, wherein the second brake (B2) and the second clutch (K2) are multi-disk couplings, and inner disks (17, 21) or outer disks (18, 20) of the second brake (B2) and the second clutch (K2) are both supported by the sixth shaft (7).

7. A multi-stage transmission of a planetary design for a motor vehicle, the transmission comprising:

a housing (1) accommodating first, second, third and fourth planetary gear sets (P1, P2, P3, P4) and a plurality of shafts (2 to 9), first, second and third clutches (K1, K2, K3) and first, second and third brakes (B1, B2, B3) whose selective actuation implements various transmission ratios between a drive shaft (2) and an output shaft (3), extending coaxially with the drive shaft (2), a carrier of the first planetary gear set (P1) being connected, via a third shaft (4), to a carrier of the second planetary gear set (P2), a ring gear of the second planetary gear set (P2) being connected to a fourth shaft (5) and being connectable to the housing (1) via actuation of the first brake (B1), a fifth shaft (6) coupling a ring gear of the first planetary gear set (P1) with a sun gear of the second planetary gear set (P2), and the fifth shaft (6) being connectable, via the first clutch (K1), to the drive shaft (2), a sun gear of the first planetary gear set (P1) being fixable, via a sixth shaft (7) and the second brake (B2), to the housing (1) and being connectable, via the second clutch (K2), to the drive shaft (2), and the first clutch (K1) and the second clutch (K2) being force-locking startup elements which implement a startup procedure of the transmission, and the first clutch (K1) and the second clutch (K2) are disposed within the housing (1) and located directly adjacent one another.

8. The multi-stage transmission according to claim 7, wherein a disk packet (22) of the first clutch (K1) and a disk packet (23) of the second clutch (K2) are disposed radially adjacent one another with respect to an axis of rotation of the drive shaft (2).

9. A multi-stage transmission of a planetary design for a motor vehicle, the transmission comprising:

a housing (1) accommodating first, second, third and fourth planetary gear sets (P1, P2, P3, P4) and a plurality of shafts (2 to 9), first, second and third clutches (K1, K2, K3) and first, second and third brakes (B1, B2, B3) whose selective actuation implements various transmission ratios between a drive shaft (2) and an output shaft (3), extending coaxially with the drive shaft (2), a carrier of the first planetary gear set (P1) being connected, via a third shaft (4), to a carrier of the second planetary gear set (P2), a ring gear of the second planetary gear set (P2) being connected to a fourth shaft (5) and being connectable to the housing (1) via actuation of the first brake (B1), a fifth shaft (6) coupling a ring gear of the first planetary gear set (P1) with a sun gear of the second planetary gear set (P2), and the fifth shaft (6) being connectable, via the first clutch (K1), to the drive shaft (2), a sun gear of the first planetary gear set (P1) being fixable, via a sixth shaft (7) and the second brake (B2), to the housing (1) and being connectable, via the second clutch (K2), to the drive shaft (2), and the first clutch (K1) and the second clutch (K2) being force-locking startup elements which implement a startup procedure of the transmission, and a plurality of axial supply channels (11 to 14) start from a drive-side end region and extend inside and along the drive shaft (2) to an end region located opposite of the drive-side end region.

* * * * *